United States Patent [19]

Beune et al.

[11] Patent Number: 4,468,367
[45] Date of Patent: Aug. 28, 1984

[54] METHOD OF UNITING A PLASTIC FIXATION PART WITH A SEALING BODY

[75] Inventors: Joannes H. Beune, Dr Hardenberg; Warner Uan de Putter, An Hardenberg, both of Netherlands

[73] Assignee: Wavin B.V., Zwolle, Netherlands

[21] Appl. No.: 526,517

[22] Filed: Aug. 26, 1983

Related U.S. Application Data

[63] Continuation of Ser. No. 216,964, Dec. 16, 1980, abandoned.

[30] Foreign Application Priority Data

Dec. 21, 1979 [NL] Netherlands ............... 7909294

[51] Int. Cl.³ .................................. B29H 9/00
[52] U.S. Cl. .............................. 264/255; 285/110; 285/379
[58] Field of Search ............... 285/369, 345, 110, 111, 285/374; 277/291, 294, 297, 207 A; 264/328.7, 328.8, 255, DIG. 67, 262, 263

[56] References Cited

U.S. PATENT DOCUMENTS

| | | | |
|---|---|---|---|
| 3,516,693 | 6/1970 | Glover | 285/345 X |
| 3,857,584 | 12/1974 | Oostenbrink | 285/379 X |
| 3,938,834 | 2/1976 | Oostenbrink | 285/345 |
| 4,120,521 | 10/1978 | Parmann | 285/345 X |
| 4,159,298 | 6/1979 | Bainard | 264/262 |
| 4,173,362 | 11/1974 | Glover et al. | 285/345 |
| 4,174,125 | 11/1979 | Wyss | 285/110 |
| 4,269,802 | 5/1981 | Linne | 264/255 |
| 4,299,412 | 11/1981 | Parmann | 285/110 |

FOREIGN PATENT DOCUMENTS

| | | | |
|---|---|---|---|
| 853082 | 10/1970 | Canada | 285/379 |
| 1157929 | 7/1969 | United Kingdom | 285/345 |
| 1236907 | 6/1971 | United Kingdom | 285/369 |

Primary Examiner—Dave W. Arola
Attorney, Agent, or Firm—Wilkinson, Mawhinney & Theibault

[57] ABSTRACT

Method for uniting a plastic fixation part with a sealing body comprising a head end and a sealing sleeve, by first molding the sealing body and subsequently molding the plastic fixation part around the head end of the sealing body, thereby protecting the sealing sleeve. The fixation part is provided with corrugations for connecting said fixation part with a socket pipe provided with corrugations on its outer side.

The method may be carried out in an apparatus comprising a first mold part, a second mold part and a third mold part forming together a molding space for forming the sealing body and a forth mold part replacing the first mold part, forms a molding space for molding the fixation part.

1 Claim, 5 Drawing Figures

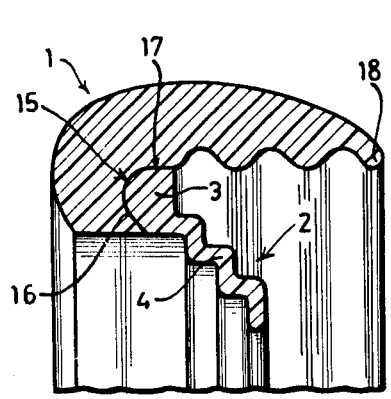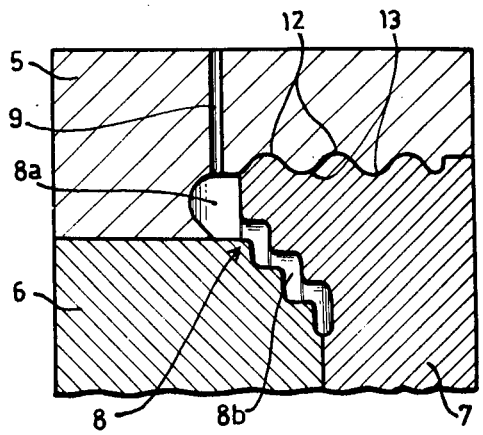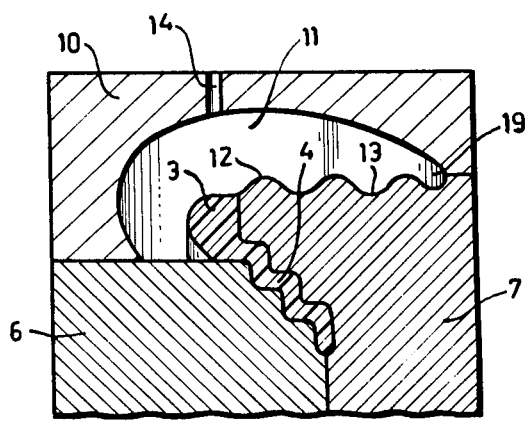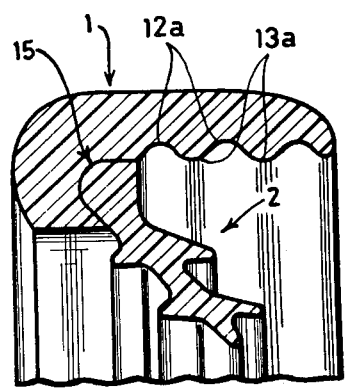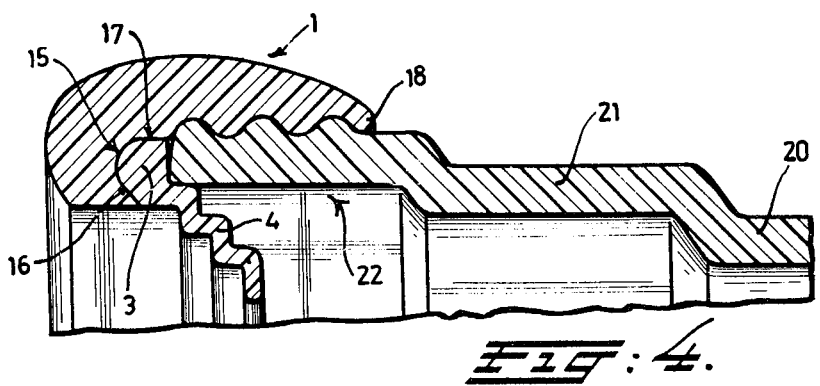

METHOD OF UNITING A PLASTIC FIXATION PART WITH A SEALING BODY

This application is a continuation of application Ser. No. 216,964, filed Dec. 16, 1980 now abandoned.

BACKGROUND OF THE INVENTION

1. Field of the Invention

The present invention relates to a method for uniting a plastic fixation part being attachable to an end portion of a pipe part, with a sealing body comprising a head end and a sealing sleeve, in order to obtain a pipe connection.

2. Description of the Prior Art

In the prior art methods of this type have been used. They disclose accomodating a resilient sealing body comprising a head end and a sealing sleeve, in a rigid thermoplastic fixation part, whereupon the fixation part is attached upon the end portion of a socket. As both the surface of the fixation part co-operating with the outer side of the socket pipe part and the outer surface of said socket pipe part co-operating with the fixation part are corrugated, the resilient properties of the head end of the sealing body permit said fixation part to undergo an axial movement when the latter vigorously hits the bottom of the respective socket pipe part, which movement is subsequently terminated.

In view of the latter, any damages to socket pipe parts of the abovementioned types and particularly damages to the fixation part, are avoided.

Said known methods have the drawback that uniting the fixation part with the sealing body is very laborious, and therefore, rather expensive.

Furthermore, said methods can hardly be automized so that many manual operations have to be performed.

SUMMARY OF THE INVENTION

In view of the foregoing factors and conditions of the prior art it is a primary object of the present invention to provide a method, which alleviates the abovementioned drawbacks.

This object is attained in accordance with the present invention in that after having molded the sealing body, a fixation part of plastic is molded from a plastic material, around the head end of the sealing body, whilst protecting the sealing sleeve.

In the method in accordance with the invention the sealing body is therefore first molded, preferably from a thermoplastic synthetic material having resilient properties and subsequently the fixation part is molded around the head end of the sealing body by injection molding of a plasticized plastic.

Due to the integrating properties of thermoplastic material used for the fixation part and of thermoplastic synthetic material having resilient properties such as thermoplastic rubbers, being used for the sealing body, an optimum connection of the said two parts can be obtained.

Instead of a thermoplastic rubber a cold-curing rubber may also be used.

Although a good adherence between a thermoplastic rubber and a thermoplastic material of the fixation part is very beneficial, said adherence is not essential, as an adaptation of the shape of the head end of the sealing body and the adjoining portion of the fixation part, could also lead to a firm mechanical connection between said sealing body and said fixation part.

A suitable thermoplastic rubber, properly adhering to thermoplastic, is ARNITEL from AKZO.

A sealing body of synthetic material having resilient properties, such as thermoplastic rubber, is very advantageously molded in a first molding space, whereupon a second moulding space is formed adjacent the molded head end of the sealing body, while maintaining the first molding space for the sealing sleeve, whereafter the fixation part is molded in said second molding space.

The present invention also relates to a plastic fixation part with a sealing body, comprising a head end and a sealing sleeve, in which the fixation part has been molded from a plastic material around a pre-molded sealing body, consisting of a resilient material, more particularly a plastic rubber.

The present invention furthermore relates to apparatus for performing the method in accordance with the invention, comprising a first mold part, a second mold part, and a third mold part, together bounding a first molding space, the apparatus also comprising a forth mold part forming a second molding space beside the first molding space if said forth mold part replaces the first mold part.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 1 is a cross-section through a fixation part with a sealing body according to the present invention;

FIG. 2 is a configuration of the various different mold parts during the first step of the method for molding a sealing body;

FIG. 3 is the configuration of the mold parts during the second step of the method according to the present invention;

FIG. 4 is a fixation part with a sealing body, obtained according to the method of the invention and being removably attached to a socket pipe part;

FIG. 5 is another embodiment of a fixation part with a sealing body obtained according to the method of the present invention.

DESCRIPTION OF PREFERRED EMBODIMENTS

Initially referring to FIG. 1 a fixation part 1, consisting of a thermoplastic material, particularly polyethylene or polypropylene, is firmly connected with a sealing body 2, comprising a head end 3 and a sealing sleeve 4.

Molding said fixation part 1 with sealing body 2 proceeds according to the embodiments of FIGS. 2 and 3.

Referring now to FIG. 2 a first mold part 5, engages a second mold part 6, and a third mold part 7, thereby forming a first molding space 8. Said first molding space comprises a molding space portion 8a for molding the head end 3 of the sealing body and a molding space part 8b for molding the sleeve 4.

In said FIG. 2 the sealing sleeve presents a stepped configuration.

Through injection supply channel 9 thermoplastic rubber is injected into the first molding space 8, which material fills said space, so that a sealing rubber body 2 is shaped. The sealing body 2 has a steplike shape.

After having produced said sealing body 2 the first mold part 5 is removed, whilst the second mold part 6 and the third mold part 7 are maintained, however, in such a way, that the sealing sleeve 4, molded in molding space region 8b, remains well supported and protected against any contact with other products.

Subsequently a forth mold part 10 is installed which provides a second molding space 11. Said molding space 11 arranged between forth mold part 10, second mold part 6 and third mold part 7, is entirely filled with thermoplastic material, supplied by injection of said material through plastic supply channel 14 (FIG. 3). Said thermoplastic material, may for instance consist of a polyolefin such as a polyethylene or of polypropylene.

By using certain thermoplastic rubbers for filling the space regions 8a and 8b, while molding the sealing body 2, an optimum connection can be obtained between surface 15 of head end 3 of sealing body 2, with a fixation part of thermoplastic molded in the second molding space 11. When, however, a proper mechanical connection is used, the aforedescribed connection is not essential.

Molding seams 16, which may be formed by using a subdivided first mold part 5, will not give rise to any sealing problems, as said molding seams are received in correspondingly shaped recesses of the fixation part 2, so that an optimum seal is accomplished by melting together the surface 15 of the head end 3 of the sealing body 2 and the inner surface of the fixation part, facing the latter assembly.

After having molded said fixation part 1, the forth mold part 10 is first removed and subsequently the third mold part 7, an operation which can be properly effected in that the thickness of the fixation part decreases, toward its free end 18, due to a decrease of the cross section of the molding space 11 toward its free end 19.

The deformation of part 1a of the fixation part 1, further permits the third mold part 7, notwithstanding the wave crests 12 and the wave valleys 13, to be easily removed. The wave crests 12 and wave valleys 13 form corrugations 12a, 13a on the inner side of the fixation part 1.

Finally the second mold part 6 is removed.

As can be seen, the sealing body is not deformed, durig the removal of the respective mold parts during the molding process.

Referring now to FIG. 4 the mounting is shown of the pre-formed fixation part 1, with the sealing body 2 upon a socket part 21 of a pipe part 20 of polyvinylchloride. The inner end of said socket part 21 comprises a chamber 22, for receiving the sealing sleeve 4. The outer side of the socket part 21 is provided with corrugations, engaging the corrugations 12a, 13a on the inner side of the fixation part 1.

Referring now to FIG. 5 a modified embodiment of the sealing body 2, comprises seal-improving ribs, being firmly connected with a fixation part 1 of polypropylene.

In order to obtain said fixation part, one proceeds in a manner corresponding to the manner of molding the fixation part of FIG. 1. It should be noted that in the fixation part of FIG. 5 a secure anchoring of the sealing body in the recess or cavity 15 is accomplished.

What is claimed is:

1. The method of forming a plastic fixation part attachable to an end portion of a pipe socket part having end corrugations and a sealing body having a head portion and a sealing sleeve comprising the steps of forming a first molding space, firstly molding the sealing body of thermoplastic rubber having resilient properties in said first molding space wherein its head portion and its sealing sleeve are simultaneously formed into a unitary structure, thereafter forming a second molding space and forming the fixation part by forming a radially inturned portion defining a recess in said second molding space adjacent the head portion of said sealing body part by injecting polyolefins in said second molding space while the sealing sleeve does not shift position and is in situ in said first molding space thereby securing the head portion of said sealing body to said fixation part in the area of the recess of said fixation part.

* * * * *